United States Patent

Maier et al.

[11] 4,029,468
[45] June 14, 1977

[54] TRANSFER DYES

[75] Inventors: Karl Maier; Fritz Graser; Guenter Meyer, all of Ludwigshafen, Germany

[73] Assignee: BASF Aktiengesellschaft, Ludwigshafen (Rhine), Germany

[22] Filed: June 2, 1975

[21] Appl. No.: 582,727

[30] Foreign Application Priority Data

July 4, 1974 Germany .................... 2432149

[52] U.S. Cl. .................... 8/2.5 A; 8/39 B; 8/39 C
[51] Int. Cl.[2] .................... B41C 1/06; D06P 1/22
[58] Field of Search .................... 8/2.5, 2.5 A

[56] References Cited

UNITED STATES PATENTS

| | | | |
|---|---|---|---|
| 3,792,968 | 2/1974 | Rickenbacker | 8/2.5 |
| 3,888,623 | 7/1975 | Clarke | 8/2.5 |

OTHER PUBLICATIONS

Color index, 3rd Edition, vol. 2, pp. 2479–2480, 2672 Pub. by Soc. Dyers & Col., Yorkshire, England.
Amer. Dyestuff Rep. Jan. 4, 1965 pp. 27–37.

*Primary Examiner*—Donald Levy
*Attorney, Agent, or Firm*—Keil, Thompson & Shurtleff

[57] ABSTRACT

Dye formulations for transfer printing which in addition to conventional ingredients contain dyes of the formula

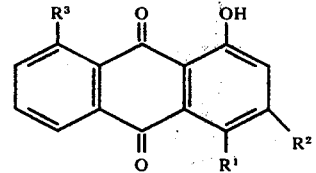

in which $R^1$, $R^2$ and $R^3$ are hydrogen, hydroxy, chloro, bromo or alkylamino substituents, one of $R^1$ to $R^3$ being different from hydrogen. The dyes are distinguished by a comparatively very low transfer temperature.

5 Claims, No Drawings

TRANSFER DYES

The invention relates to the use of a dye of the formula (I):

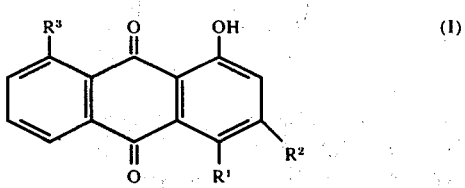

in which
R¹ is hydrogen, chloro, bromo, hydroxy or alkylamino of one to four carbon atoms;
R² is hydrogen, chloro or bromo; and
R³ is hydrogen or hydroxy; with the proviso that one of the radicals R¹, R² and R³ is other than hydrogen, for transfer printing; it also relates to appropriate printing inks and auxiliary carriers.

Examples of individual dyes are the compounds of the formulae

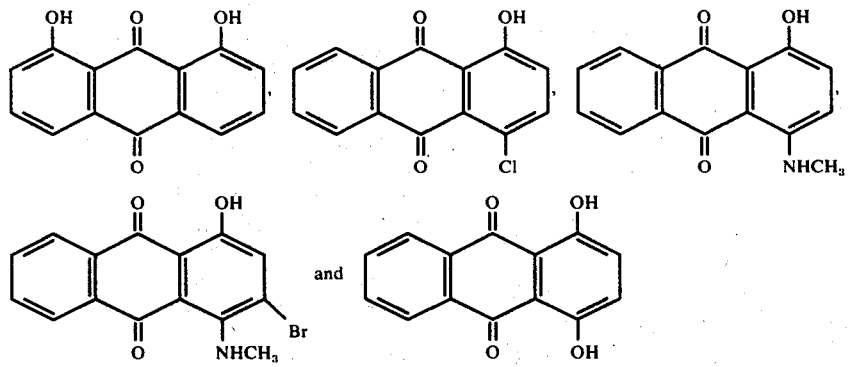

of which the first two are yellow, the last is orange and the others are bluish violet.

The dyes of formula (I) may be processed into printing inks by known methods. They have a particularly favorable sublimation temperature and a high rate of sublimation so that it is possible for example to increase the speed of production in transfer printing and to avoid fiber damage.

The dye formulations according to the invention contain (in addition to the dyes of the formula (I)) auxiliaries such as are necessary and customary in transfer printing processes. Dye formations for transfer printing are described for example in German Laid-Open Specification (DOS) No. 1,771,813. The transfer printing process and temporary supports therefor are illustrated for example in German Laid-Open Specifications Nos. 1,769,757 and 1,771,812.

The dye formulations normally consist of the dye, a soluble resin serving as carrier, a solvent which is capable of dissolving the resin and optionally a thickener or extender. The thickener may be the resin which serves as the dye carrier.

Suitable resins are synthetic, semisynthetic and natural resins, the synthetic and semisynthetic resins being polymers, condensation polymers or polyadducts. In principle, any resin or binder conventionally employed in the surface coatings or printing ink industries may be used (cf. for example Lackrohstofftabellen by Karsten, 3rd and 4th editions, Hannover, 1963 and 1967; Wagner and Sarx, "Lackkunstharze," 4th ed., Munich, 1959). Those resins are preferred as carriers in the dye formulations which do not react in the air or with themselves, for example by crosslinking, although such reactive resins may be used. The said specifications and literature are incorporated herein by reference.

The following Examples illustrate the invention. Parts and percentages in the Examples are by weight unless otherwise stated.

EXAMPLE 1

Paper is printed by flexographic printing with a color which consists of 10 parts of the dye of the formula:

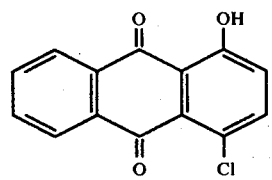

5 parts of ethyl cellulose, 70 parts of ethyl alcohol, 20 parts of ethyl acetate and 5 parts of ethyl glycol and the print is dried. The paper is laid with the printed side in contact with a polyester woven cloth and passed together therewith through a calendering machine for 15 seconds at 150° C. The dye is thus transferred to the cloth, a yellow print being obtained on a white ground.

EXAMPLE 2

Paper is printed by rotogravure printing with a color consisting of 5 parts of the dye of the formula:

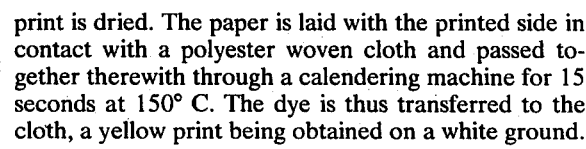

20 parts of a styrene polymer and 80 parts of toluene and the print is dried. The paper print is transferred to a polyamide cloth as described in Example 1. A bluish violet print is obtained on a white ground.

EXAMPLE 3

A paper is printed by rotary screen printing with a color consisting of 20 parts of the dye of the formula:

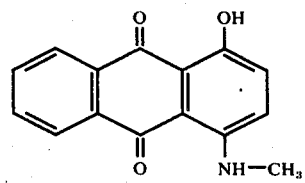

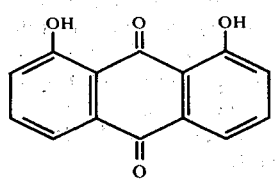

380 parts of water, 400 parts of a 10% flour ether thickening and 200 parts of a 10% starch ether thickening and the print is dried. The paper print is then transferred as described in Example 1 to a polyester cloth in thirty seconds at 160° C. A yellow print is obtained on a white ground.

Similar results are obtained when other dyes of formula (I) are used.

EXAMPLE 4

Paper is printed by flexographic printing with a color which consists of 10 parts of the dye of the formula:

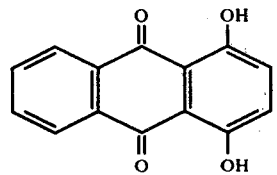

5 parts of ethyl cellulose, 70 parts of ethyl alcohol, 20 parts of ethyl acetate and 5 parts of ethyl glycol and the print is dried. The paper is laid with the printed side in contact with a polyester woven cloth and passed together therewith through a calendering machine for 15 seconds at 160° C. The dye is thus transferred to the cloth, an orange print being obtained on a white ground.

EXAMPLE 5

Paper is printed by rotogravure printing with a color consisting of 5 parts of the dye of the formula:

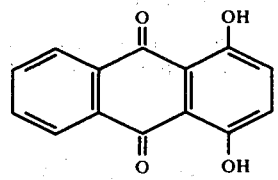

20 parts of a styrene polymer and 80 parts of toluene and the print is dried. The paper print is transferred to a polyamide cloth as described in Example 1. An orange print is obtained on a white ground.

EXAMPLE 6

A paper is printed by rotary screen printing with a color consisting of 20 parts of the dye of the formula:

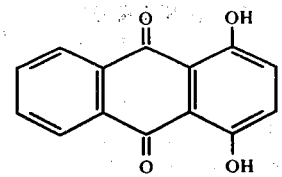

380 parts of water, 400 parts of a 10% flour ether thickening and 200 parts of a 10% starch ether thickening and the print is dried. The paper print is then transferred as described in Example 1 to a polyester cloth in thirty seconds at 160° C. An orange print is obtained on a white ground.

EXAMPLE 7

A transfer paper is printed by rotogravure printing with any desired pattern with a color consisting of 10 parts of the dye of the formula

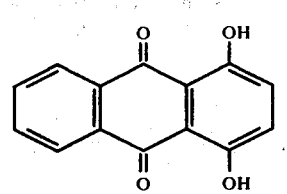

40 parts of phenol-modified rosin, 20 parts of a vegetable drying oil, 10 parts of a long-oil alkyd resin, 25 parts of mineral oil and 5 parts of aerosil. The print is dried, placed with the printed side on a polyester knitted cloth and treated for 25 seconds at 160° C on a press. An orange print on a white ground is obtained which shows good fastness to light and wet treatments.

We claim:

1. A dye formulation for transfer printing containing in addition to conventional ingredients a dye of the formula

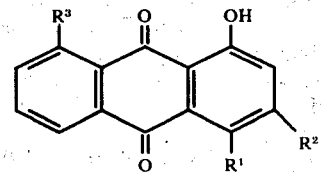

in which
$R^1$ is chloro,
$R^2$ is hydrogen, and
$R^3$ is hydrogen.

2. A non-textile transfer stratum of cellulose having a dyestuff according to the formula of claim 1 printed thereon.

3. A transfer stratum according to claim 2 consisting of paper.

4. A transfer stratum according to claim 2 in which a cellulose ether or cellulose ester is used to bind the dyestuff to the transfer stratum.

5. In the process for sublimation transfer printing tentiles of hydrophobic synthetic fibers the step comprising transferring a dyestuff of the formula according to claim 1 to the synthetic textile.

* * * * *